United States Patent
Wang et al.

(10) Patent No.: US 11,402,644 B1
(45) Date of Patent: Aug. 2, 2022

(54) HEAD SECUREMENT FOR HEAD-MOUNTABLE DEVICE

(71) Applicant: Apple Inc., Cupertino, CA (US)

(72) Inventors: Paul X. Wang, Cupertino, CA (US); Dustin A. Hatfield, Los Gatos, CA (US); Venkata Narayana Murthy Arelekatti, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/339,479

(22) Filed: Jun. 4, 2021

Related U.S. Application Data

(60) Provisional application No. 63/049,552, filed on Jul. 8, 2020.

(51) Int. Cl.
*G09G 5/00* (2006.01)
*G02B 27/01* (2006.01)

(52) U.S. Cl.
CPC ..... *G02B 27/0176* (2013.01); *G02B 27/0179* (2013.01); *G02B 2027/0154* (2013.01); *G02B 2027/0161* (2013.01)

(58) Field of Classification Search
CPC ............ G02B 27/0176; G02B 27/0179; G02B 2027/0154; G02B 2027/0161
USPC .......................................................... 345/8
See application file for complete search history.

(56) References Cited

U.S. PATENT DOCUMENTS

| | | | | |
|---|---|---|---|---|
| 6,058,935 | A * | 5/2000 | Talley | A61F 5/56 128/848 |
| 8,957,835 | B2 | 2/2015 | Hoellwarth | |
| 9,081,210 | B2 | 7/2015 | Adams et al. | |
| 2009/0083950 | A1* | 4/2009 | Corogin | F16L 33/08 24/274 R |
| 2013/0235331 | A1* | 9/2013 | Heinrich | G02C 11/10 351/158 |
| 2014/0033402 | A1* | 2/2014 | Donnadieu | A42B 3/122 2/413 |
| 2016/0062454 | A1* | 3/2016 | Wang | G06T 19/006 345/633 |
| 2016/0187654 | A1* | 6/2016 | Border | G02B 5/18 359/567 |
| 2017/0082859 | A1* | 3/2017 | Drinkwater | G02B 27/0176 |
| 2017/0364144 | A1* | 12/2017 | Petrov | G06F 3/011 |
| 2018/0046147 | A1* | 2/2018 | Aghara | G05B 13/021 |
| 2019/0004325 | A1* | 1/2019 | Connor | G02B 27/0172 |
| 2020/0050236 | A1* | 2/2020 | Lin | G06F 1/163 |
| 2020/0117008 | A1* | 4/2020 | Kitakami | G06F 3/011 |

* cited by examiner

*Primary Examiner* — Jonathan M Blancha
(74) *Attorney, Agent, or Firm* — Bakerhostetler

(57) ABSTRACT

Systems of the present disclosure can provide a head-mountable device that distributes securement forces to sides of the user's head. A head-mountable device can include a head securement element with arms that clamp onto sides of the user's head. Such arms can be pivotably coupled to a frame of the head-mountable device. Where a band is provided, the band can have an adjustable width that tightens onto the sides of the user's head to reduce the load on the front and rear of the user's head. A head-mountable device can also distribute forces (e.g., weight) onto the top of the user's head without restricting facial features of the user (e.g., forehead, eyes, etc.).

15 Claims, 6 Drawing Sheets

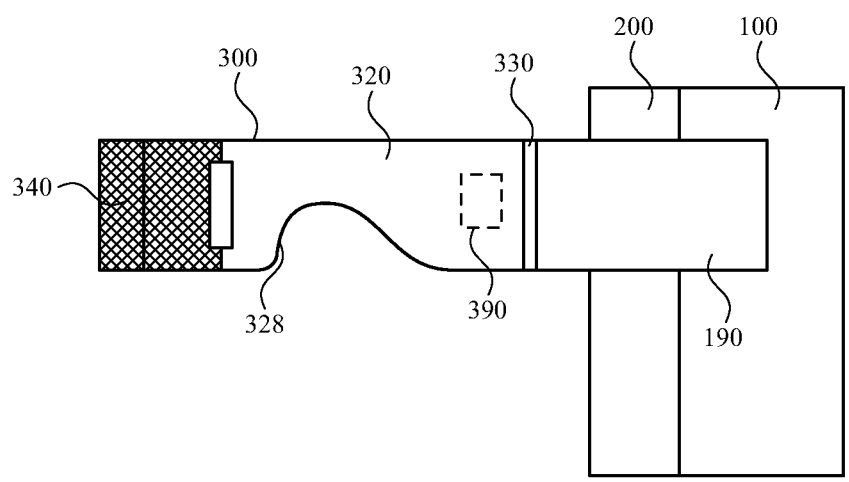
FIG. 5
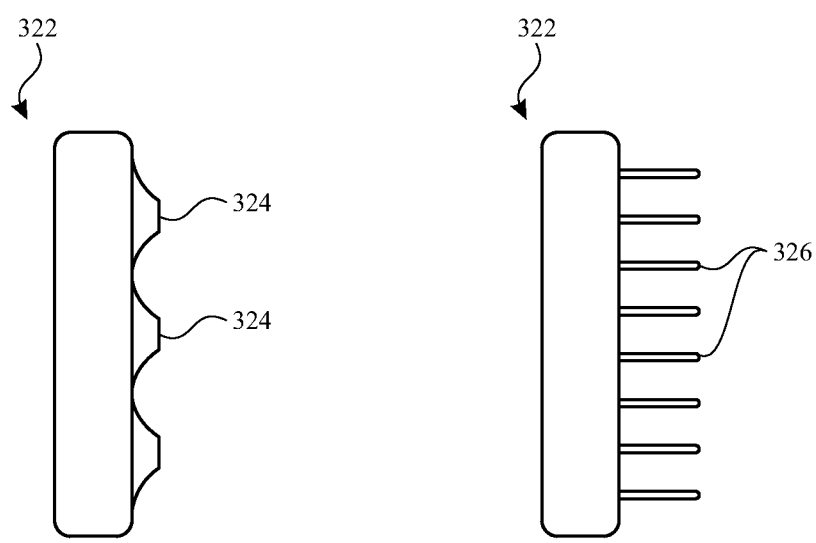
FIG. 6  FIG. 7

HEAD SECUREMENT FOR HEAD-MOUNTABLE DEVICE

CROSS-REFERENCE TO RELATED APPLICATION

This application claims the benefit of U.S. Provisional Application No. 63/049,552, entitled "HEAD SECUREMENT FOR HEAD-MOUNTABLE DEVICE," filed Jul. 8, 2020, the entirety of which is incorporated herein by reference.

TECHNICAL FIELD

The present description relates generally to head-mountable devices, and, more particularly, to head securement mechanisms for securing a head-mountable devices to a head of a user.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

FIG. 5 illustrates a side view of a head-mountable device, according to some embodiments of the present disclosure.

FIG. 6 illustrates a rear view of an arm of a head-mountable device, according to some embodiments of the present disclosure.

FIG. 7 illustrates a rear view of another arm of a head-mountable device, according to some embodiments of the present disclosure.

DETAILED DESCRIPTION

Figure 1:
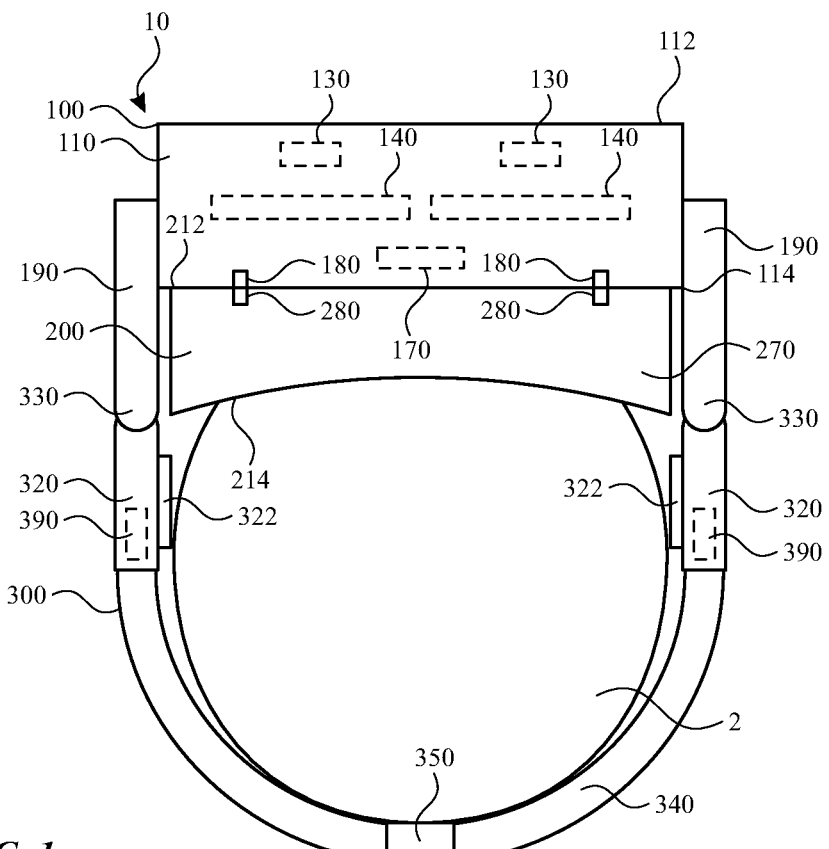
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

A head-mountable device can be secured to a head of a user while being worn and used by the user. It can be desirable to maximize the fit and comfort on the user, so that usage of the head-mountable device for extended durations is not difficult for the user.

Some head-mountable devices are designed to secure to the head of the user by wrapping tightly around the back of the user's head, for example, with a band. This arrangement often focuses forces on the front and rear of the user's head. This can be uncomfortable for the user and restrict the movement of the user's face, for example when making natural facial expressions.

Certain functions of the head-mountable device can be performed when the head-mountable device is secured in certain configurations. For example, a head-mountable device can provide sensing capabilities that are optimally performed when facial features of the user or permitted to move freely, for example when the user expresses emotions. When the head-mountable device is secured to the head in a manner that does not restrict the movement of certain facial features, then the user can comfortably wear the head-mountable device and simultaneously make natural facial expressions. Additionally, sensors of the head-mountable device can effectively detect and respond to such facial features as one of its regular operations.

It can be desirable to evenly distribute forces across a wide area of the user's head. For example, systems of the present disclosure can provide a head-mountable device that distributes securement forces to sides of the user's head. A head-mountable device can include a head securement element with arms that clamp onto sides of the user's head. Such arms can be pivotably coupled to a frame of the head-mountable device. Where a band is provided, the band can have an adjustable width that tightens onto the sides of the user's head to reduce the load on the front and rear of the user's head. A head-mountable device can also distribute forces (e.g., weight) onto the top of the user's head without restricting facial features of the user (e.g., forehead, eyes, etc.).

These and other embodiments are discussed below with reference to FIGS. 1-13. However, those skilled in the art will readily appreciate that the detailed description given herein with respect to these Figures is for explanatory purposes only and should not be construed as limiting.

According to some embodiments, for example as shown in FIG. 1, a head-mountable device 10 includes an HMD module 100 and a light seal module 200. The HMD module 100 includes a frame 110 that is worn on a head of a user. The frame 110 can be positioned in front of the eyes of a user to provide information within a field of view of the user. The HMD module 100 and/or the light seal module 200 can provide a nosepiece to rest on a user's nose.

The frame 110 can provide structure around a peripheral region thereof to support any internal components of the HMD module 100 in their assembled position. For example, the frame 110 can enclose and support various internal components (including for example integrated circuit chips, processors, memory devices and other circuitry) to provide computing and functional operations for the head-mountable device 10, as discussed further herein. While several components are shown within the frame 110, it will be understood that some or all of these components can be located anywhere within or on the head-mountable device 10. For example, one or more of these components can be positioned within the light seal module 200 and/or a head securement element 300 of the head-mountable device 10.

The frame 110 can include and/or support one or more camera modules 130. The camera modules 130 can be positioned on or near an outer side 112 of the frame 110 to capture images of views external to the head-mountable device 10. As used herein, an outer side of a portion of a head-mountable device is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 10 can include display elements 140 that provide visual output for viewing by a user wearing the head-mountable device 10. One or more display elements 140 can be positioned on or near an inner side 114 of the frame 110. As used herein, an inner side 114 of a portion of a head-mountable device is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance ("IPD") of the user. IPD is defined as the distance between the centers of the pupils of a user's eyes.

The pair of display elements 140 can be mounted to the frame 110 and separated by a distance. The distance between the pair of display elements 140 can be designed to correspond to the IPD of a user. The distance can be adjustable to account for different IPDs of different users that may wear the head-mountable device 10. For example, either or both of the display elements 140 may be movably mounted to the frame 110 to permit the display elements 140 to move or translate laterally to make the distance larger or smaller. Any type of manual or automatic mechanism may be used to permit the distance between the display elements 140 to be an adjustable distance. For example, the display elements 140 can be mounted to the frame 110 via slidable tracks or guides that permit manual or electronically actuated movement of one or more of the display elements 140 to adjust the distance there between.

Additionally or alternatively, the display elements 140 can be moved to a target location based on a desired visual effect that corresponds to user's perception of the display element 140 when it is positioned at the target location. The target location can be determined based on a focal length of the user and/or optical elements of the system. For example, the user's eye and/or optical elements of the system can determine how the visual output of the display element 140 will be perceived by the user. The distance between the display element 140 and the user's eye and/or the distance between the display element 140 and one or more optical elements can be altered to place the display element 140 at, within, or outside of a corresponding focal distance. Such adjustments can be useful to accommodate a particular user's eye, corrective lenses, and/or a desired optical effect.

As shown in FIG. 1, the light seal module 200 can include a chassis that provides structural support to one or more other components of the light seal module 200. The chassis 210, or portions thereof, can extend to, from, and/or between the inner side 214 and the outer side 212. The chassis 210 can support a cover 270 that extends at least partially from the outer side 212 to the inner side 214. The chassis and/or the cover 270 can define an interior space through which light can pass, thereby providing to the user wearing the head-mountable device a view of a display element of the HMD module 100. Such a view can be enhanced by preventing the ingress of light from the external environment and into the light seal module 200.

As further shown in FIG. 1, attachment elements can facilitate coupling of the HMD module 100 to the light seal module 200 in a relative position and orientation that aligns the display elements 140 of the HMD module 100 in a preferred position and orientation for viewing by the user. The HMD module 100 and the light seal module 200 can be coupled to prevent ingress of light from an external environment. For example, HMD module attachment elements 180 can releasably engage light seal module attachment elements 280. One or more of various mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the HMD module 100 and the light seal module 200 together. The modules can remain secured to each other until an optional release mechanism is actuated. The release mechanism can be provided on an outer surface of the head-mountable device 10 for access by a user.

While the light seal module 200 is shown schematically with a particular size and shape, it will be understood that the size and shape of the light seal module 200, particularly at the inner side 214 of the light seal module 200, can have a size and shape that accommodates the face of a user wearing the head-mountable device 10. For example, the inner side 214 can provide a shape that generally matches the contours of the user's face around the eyes of the user. The inner side 214 can be provided with one or more features that allow the light seal module 200 to conform to the face of the user to enhance comfort and block light from entering the light seal module 200 at the point of contact with the face. For example, the inner side 214 can provide a flexible, soft, elastic, and/or compliant structure.

The HMD module 100 and/or the light seal module 200 can include a sensor 170. The sensor 170 can be positioned and arranged to detect a characteristic of the user, such as facial features. For example, such a user sensor can perform facial feature detection, facial movement detection, facial recognition, eye tracking, user mood detection, user emotion detection, voice detection, and the like. The head-mountable device 10 can facilitate such detections by reducing the load (e.g., weight) on the user's and distributing forces to other regions of the user's head, such as the top, rear, and/or sides of the user's head, as discussed further herein.

The HMD module 100 and/or the light seal module 200 can be supported on a user's head 2 with a head securement element 300. The head securement element 300 can wrap or extend along opposing sides of a user's head 2 and/or to a rear of the user's head 2. The head securement element 300 can optionally include earpieces for wrapping around or otherwise engaging or resting on a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10.

As shown in FIG. 1, the head securement element 300 can include arms 320 on opposing sides. Each of the arms 320 can be pivotably coupled to the HMD module 100 of the head-mountable device 10. For example, the HMD module 100 can include extensions 190 that extend from and/or are integrally formed with the frame 110. The extensions 190 and the frame 110 can form a continuous, rigid structure. It will be understood that the extensions 190 can optimally be a portion of the frame 110 or another component of the HMD module 100.

The arms 320 can provide a substantially rigid structure for support. Optionally, the arms 320 can support one or more pads 322 on inward facing surfaces thereof. The pads 322 can provide engagement features for comfortably engaging the head 2 of the user. The pads 322 can include soft, flexible, compressible, and/or elastic features. For example, the pads 322 can be of a rubber and/or foam composition. By further example, the pads 322 can include extensions that avoid gripping any hair of the user, as described further herein.

The head securement element 300 can further include a band 340 for extending to and/or about a rear side of the head 2 of the user. The band 340 can optionally extend from ends of the arms 320. The band 340 can be stretchable to comfortably provide tension about the head of the user.

The head securement element 300 can further include an adjustment element 350 for adjusting a tightness and/or fit of the head securement element 300. The adjustment element 350 can, for example, be operated to alter a total length of the band 340 and/or a distance between the arms 320. The adjustment element 350 can be operated manually by a user and/or by a controller of the head-mountable device 10 (e.g., in the HMD module 100). Operation of the adjustment element 350 can alter the fit of the band 340 as well as the clamping force of the arms 320 on sides of the user's head 2.

As further shown in FIG. 1, one or more of the arms 320 can include an electronic component 390. To provide clamping forces, the arms 320 can provide robust and rigid structures on sides of the user's head. Such structures can also be used to support electronic components 390 that are operably connected to other components of the head-mountable device 10 (e.g., in the HMD module 100). Additionally, the arms 320 provide a location that is preferred for certain components, such as speakers to direct sound to the ears of the user.

Figure 2:
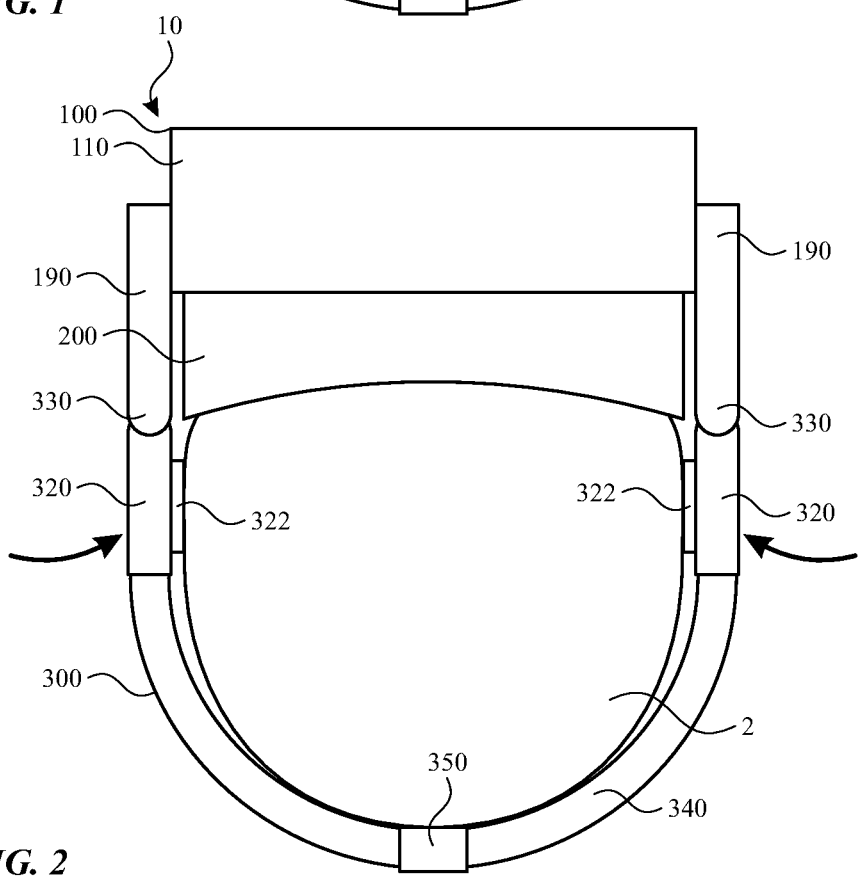
FIG. 2 illustrates a top view of a head-mountable device, according to some embodiments of the present disclosure.

Referring now to FIG. 2, the arms of the head securement element can be adjusted to provide clamping forces on sides of the user's head. As shown in FIG. 2, each of the arms 320 can be pivoted with respect to the HMD module 100. Such movement can cause the arms 320 to move towards each other and against sides of the user's head 2.

The arms 320 can be coupled to the HMD module 100 by hinges 330. The hinges 330 can allow the arms 320 to pivot relative to the HMD module 100, for example by moving towards or away from each other. By further example, the hinges 330 can provide rotation about axes that are parallel to each other and/or that extend substantially vertically along sides of the head-mountable device 10.

The action of the arms 320 can be facilitated by the hinges 330, which can couple the arms 320 to the extensions 190 and/or another component of the HMD module 100, such as the frame 110. As the arms 320 are pressed against the sides of the user's head 2, the pads 322 can compress somewhat and provide engagement across a wide surface area. Upon release, the hinges 330 can maintain the arms 320 in an engaged position against the head of the user, for example with the pads 322 in a compressed configuration. For example, the hinges 330 can include a hollow clutch or other mechanism to provide internal friction that maintains a rotational orientation of the parts at low levels of torque. By further example, a higher level of torque can allow the arms 320 to pivot to a new position that is then maintained upon release.

It will be understood that other mechanisms can be provided to provide a clamping force on sides of the user's head. For example, the arms 320 can be elastically biased inwardly towards each other to provide forces on the sides of the user's head. Such a biasing can be provided by separate biasing elements (e.g., springs) or by the innate structure of the arms 320 themselves.

It will be further understood that the arms 320 can provide clamping forces as a function of the band 340. For example, where the band 340 extends from and portions of the arms 320, the tension in the band 340 can pull the arms 320 towards each other and against sides of the user's head 2. By further example, the adjustment element 350 can be operated to adjust both tension and the band 340 and clamping forces of the arms 320.

The arms can provide the clamping force on structures of the head of the user to provide additional support to the HMD module 100 and/or the light seal module 200. For example, the arms 320 can be positioned and configured to provide clamping forces at and/or above the zygomatic arch of the user's head 2 and/or adjacent structures. Due to the shape of such facial structures, the clamping force applied by the arms 320 can be directed inwardly and result in a response force applied to the arms 320 in a partially upward direction. This can help support the weight of the head-mountable device 10 while worn by a user, thereby distributing the weight away from the face of the user.

Figure 3:
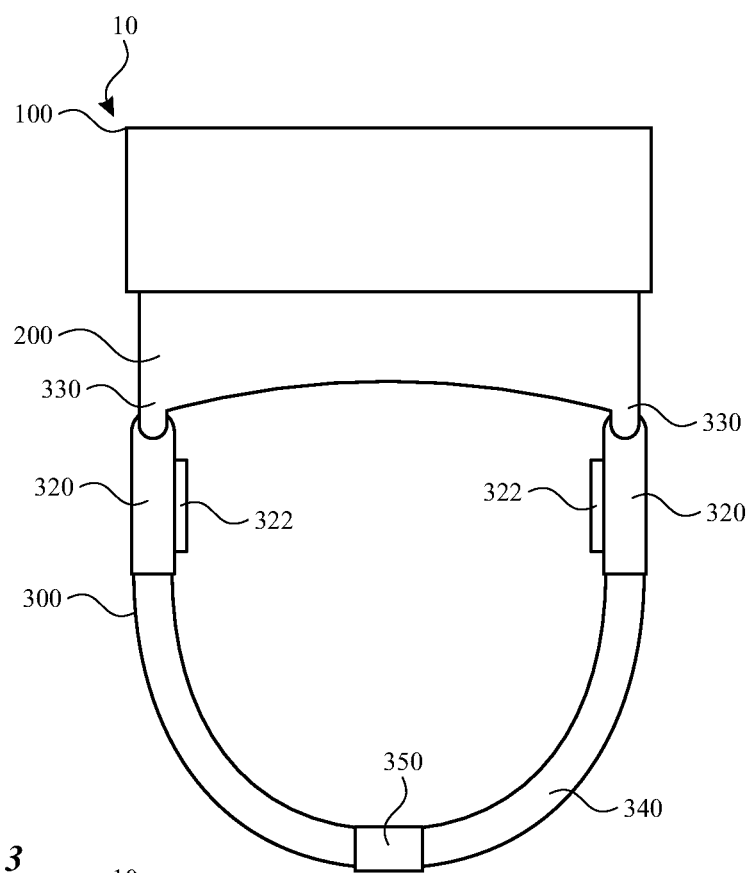
FIG. 3 illustrates a top view of a head-mountable device, according to some embodiments of the present disclosure.

Referring now to FIG. 3, the head securement element can optionally extend from the light seal module. While the head-mountable device 10 of FIG. 3 is illustrated in a simplified form, it will be understood that components of the head-mountable device 10 of FIG. 1 can be included in the head-mountable device 10 of FIG. 3 unless otherwise indicated.

As shown in FIG. 3, the head securement element 300 can include arms 320 on opposing sides, with each of the arms 320 being coupled to the light seal module 200 of the head-mountable device 10. For example, the arms 320 can be pivotably coupled to the rigid chassis of the light seal module 200.

The arms 320 can be coupled to the light seal module 200 by the hinges 330. The hinges 330 can allow the arms 320 to pivot relative to the HMD module 100 and/or the light seal module 200, for example by moving towards or away from each other. The head securement element 300 can further include the band 340 for extending to and/or about a rear side of the head 2 of the user. The band 340 can optionally extend from ends of the arms 320. The head securement element 300 can further include an adjustment element 350 for adjusting a tightness and/or fit of the head securement element 300.

By providing the head securement element 300 with the light seal module 200, both the light seal module 200 and the head securement element 300 can be provided as separate from the HMD module 100. As such, the light seal module 200 and the head securement element 300 can be provided with features that are customized, fitted, and/or sized for a particular user.

Figure 4:
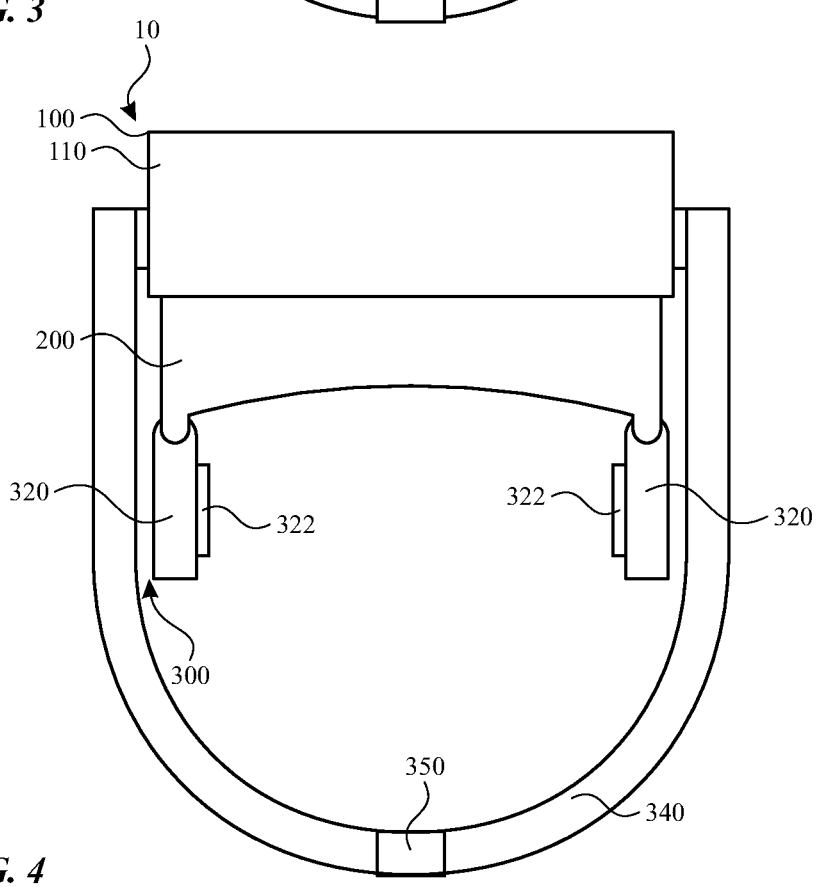
FIG. 4 illustrates a top view of a head-mountable device, according to some embodiments of the present disclosure.

Referring now to FIG. 4, the head securement element can optionally extend from both the HMD module and the light seal module. While the head-mountable device 10 of FIG. 4 is illustrated in a simplified form, it will be understood that components of the head-mountable device 10 of FIG. 1 can be included in the head-mountable device 10 of FIG. 4 unless otherwise indicated.

As shown in FIG. 4, the head securement element 300 can include arms 320 on opposing sides, with each of the arms 320 being coupled to the light seal module 200 of the head-mountable device 10. For example, the arms 320 can be pivotably coupled to the rigid chassis of the light seal module 200. The arms 320 can be coupled to the light seal module 200 by the hinges 330. The hinges 330 can allow the arms 320 to pivot relative to the HMD module 100 and/or the light seal module 200, for example by moving towards or away from each other.

The head securement element 300 can further include the band 340 for extending to and/or about a rear side of the head 2 of the user. The band 340 can optionally extend from the HMD module 100, for example from the frame thereof. The head securement element 300 can further include an adjustment element 350 for adjusting a tightness and/or fit of the head securement element 300. The band 340 may or may not be directly coupled to the arms 320 extending from the light seal module 200.

By providing the arms 320 and the band 340 with independent couplings to other components of the head-mountable device 10, the arms 320 and the band 340 can be independently adjusted. For example, either can be adjusted without directly affecting the fit of the other.

It will be further understood that both the arms 320 and the band 340 can be provided with independent couplings to the HMD module 100 (e.g., each extending from the frame of the HMD module 100). Alternatively, both the arms 320 and the band 340 can be provided with independent couplings to the light seal module 200 (e.g., each extending from the chassis of the light seal module 200).

Referring now to FIG. 5, the arms can be configured to accommodate features of the head of the user. For example, as shown in FIG. 5, the arms 320 can have a recess 328 that receives an ear of the user. By further example, the structure of the arms 320 can rest on a portion of or near the ears to secure the head-mountable device 10 to the head. The arms 320 can provide clamping forces in front of, over, and/or behind the ears of the user.

As further shown in FIG. 5, the arms 320 can include one or more electronic components 390 to provide functions at or near the sides of the head of the user. As described herein, an electronic component 390 can include output components, such as a speaker. By further example, the electronic component 390 can include an input component, such as a touch input or microphone. By further example, the electronic component 390 can include a sensor, such as a user sensor described herein. Additionally or alternatively, a sensor can be provided to detect the interaction between the arms 320 and the head. For example, a sensor can be provided to detect a magnitude of force applied to the head of the user. In response to a detected force, the head-mountable device 10 can provide an indication to a user regarding the detection. By further example, the head-mountable device 10 can actively adjust a fit of the head securement element 300 (e.g., by operation of an adjustment element and/or a biasing element). By further example, the head-mountable device 10 can provide an indication to an external system regarding the fit of the head securement element 300, such as during a fitting operation to determine a customized component for a particular user.

Referring now to FIGS. 6 and 7, the arms of a head-mountable device can include structures that comfortably engage a head of the user. For example, as shown in FIG. 6, a pad 322 of an arm that is configured to engage a head of a user can include raised surfaces 324 that penetrate hair of the user and engage the underlying skin. The raised surfaces 324 can be formed as peaks, undulations, geometric shapes, and the like. The raised surfaces 324 can be monolithic with other portions of the pad 322.

By further example, as shown in FIG. 7, a pad 322 of an arm that is configured to engage a head of a user can include beams 326 that penetrate hair of the user and engage the underlying skin. The beams 326 can extend away from other portions of the pad 322. The beams 326 can be separate from, yet coupled to, other portions of the pad 322.

By providing raised surfaces, beams, or other protruding features, the pad 322 or portions coupled thereto can engage the head of the user without gripping and pulling the hair of the user. The terminal ends can be shaped to conform to the head structures.

Figure 8:
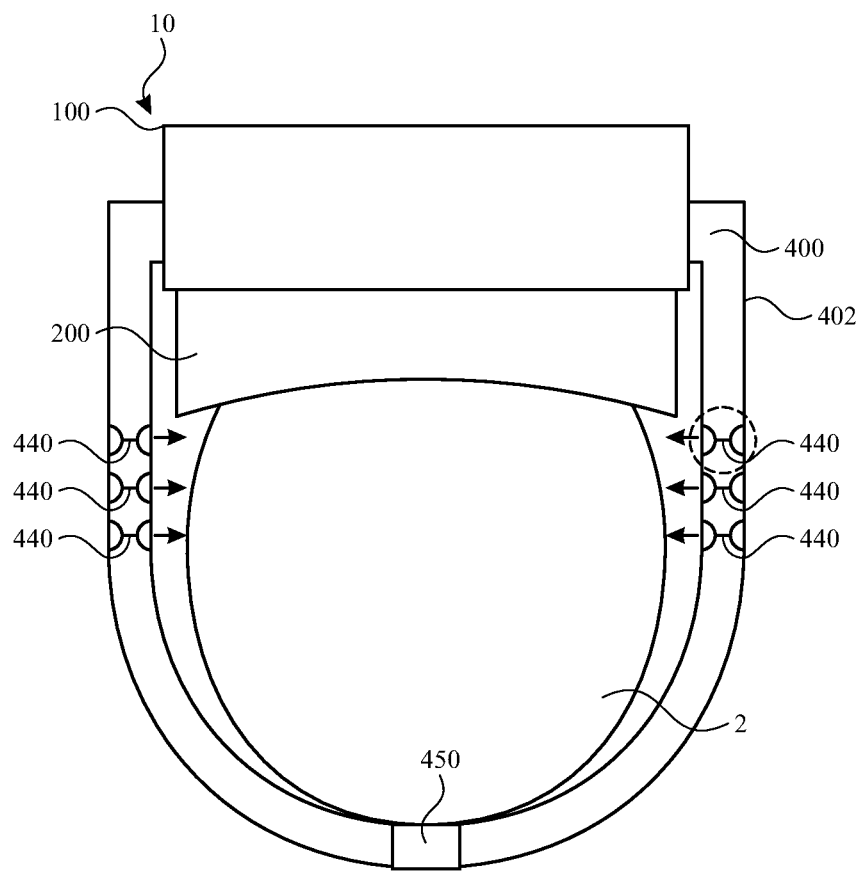
FIG. 8 illustrates a top view of a head-mountable device, according to some embodiments of the present disclosure.
Figure 9:
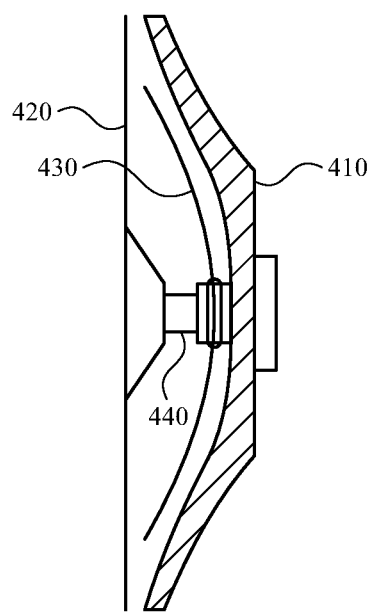
FIG. 9 illustrates an enlarged view of a width adjustment element of the head-mountable device of FIG. 8, according to some embodiments of the present disclosure.
Figure 10:
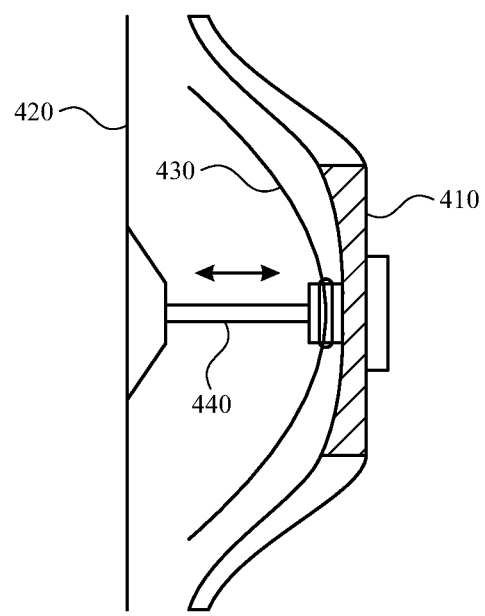
FIG. 10 illustrates another enlarged view of the width adjustment element of the head-mountable device of FIG. 8, according to some embodiments of the present disclosure.

Referring now to FIG. 8-10, a band of a head-mountable device can be provided with adjustable capabilities to engage the sides of the user's head. While the head-mountable device 10 of FIG. 8 is illustrated in a simplified form, it will be understood that components of the head-mountable device 10 of FIG. 1 can be included in the head-mountable device 10 of FIG. 8 unless otherwise indicated.

As shown in FIG. 8, a head securement element 400 can include a band 402 extending from sides of a frame of an HMD module 100. Additionally or alternatively, the head securement element 400 can extend from sides of a chassis of a light seal module 200.

The head securement element 400 can include multiple width adjustment elements 440 each configured to adjust a width of the band 402 in a corresponding region of the band 402, the width adjustment elements 440 can be positioned on opposite sides of the band 402, with one or more of the width adjustment elements 440 being positioned on the opposite sides to engage opposing sides of the head 2 of the user.

As shown in FIG. 9, the band 402 can define or include an outer wall 410. Optionally, the band 402 can define or include an inner wall 420. The width adjustment elements 440 can be positioned between the inner wall 420 and the outer wall 410. Alternatively, the width adjustment elements 440 can directly engage the head of the user without an inner wall 420.

As further shown in FIGS. 9 and 10, the width adjustment element 440 can include a mechanism that adjusts its width within or against the band 402. For example, a control thread 430 can extend within or adjacent to the band 402. A single control thread 430 can extend to each of multiple width adjustment elements 440. Additionally or alternatively, multiple control threads 430 can each extend to a corresponding one of multiple width adjustment elements 440. Movement of the control thread 430 in a first direction increases the width of the band 402, and movement of the control thread 430 in a second direction decreases the width of the band 402. For example, the width adjustment elements 440 can include a nut and threaded screw, wherein rotation of the nut by the control thread 430 advances or retracts the threaded screw. By further example, the width adjustment elements 440 can include other actuation mechanisms, such as rack and pinion systems, pistons, and the like.

Multiple width adjustment elements 440 can be adjusted with movement of the control thread 430. For example, the control thread 430 can be connected to multiple width adjustment elements 440 on one or both sides of the user's head. By further example, the width adjustment elements 440 can be adjusted simultaneously yet by different amounts. For example, the width adjustment elements 440 can include or be connected to gears or other mechanisms that manage the relative movements thereof. Accordingly, the width adjustment elements 440 can be adjusted simultaneously and/or at different rates.

Operation of the width adjustment elements 440 can be manually performed and/or automated, such as by a motor or actuator operatively connected to the HMD module 100. For example, the width adjustment elements 440 can be operated based on input from a sensor, such as a user sensor described herein. By further example, a sensor can be provided to detect the interaction between the width adjustment elements 440 and the head. For example, a sensor can be provided to detect a magnitude of force applied to the head of the user. In response to a detected force, the head-mountable device 10 can provide an indication to a user regarding the detection. By further example, the head-mountable device 10 can actively adjust a fit of the head securement element 400 (e.g., by operation of the width adjustment elements 440). By further example, the head-mountable device 10 can provide an indication to an external system regarding the fit of the head securement element 400, such as during a fitting operation to determine a customized component for a particular user.

Figure 11:
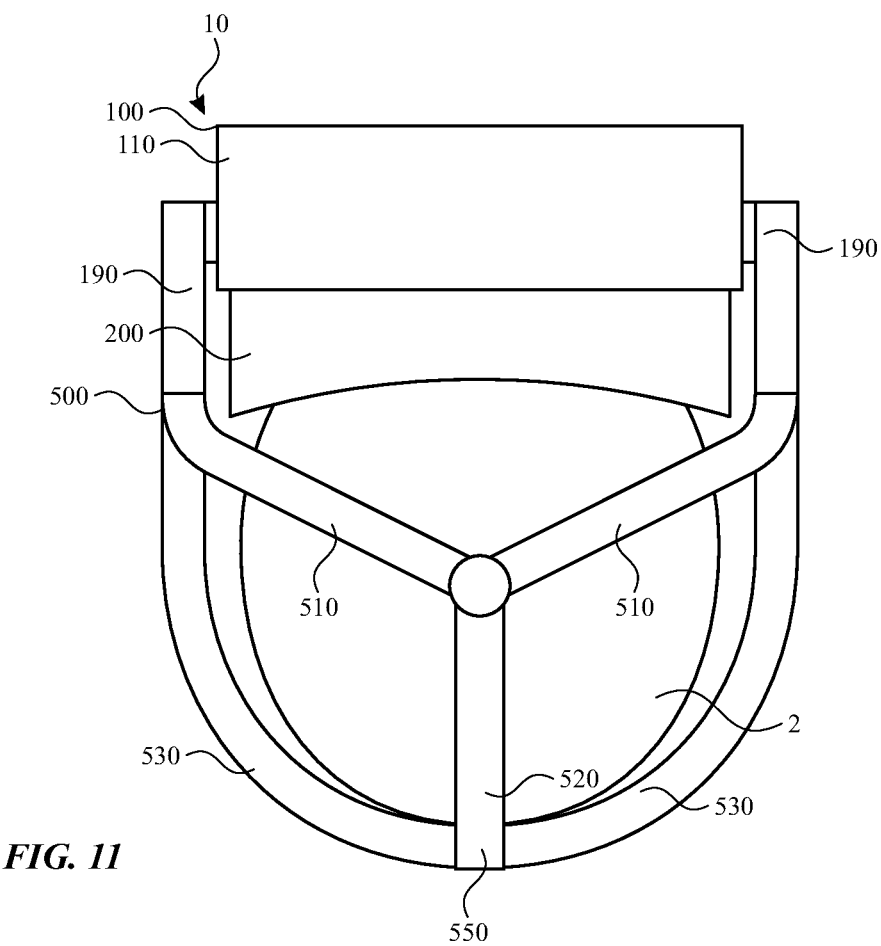
FIG. 11 illustrates a top view of a head-mountable device, according to some embodiments of the present disclosure.
Figure 12:
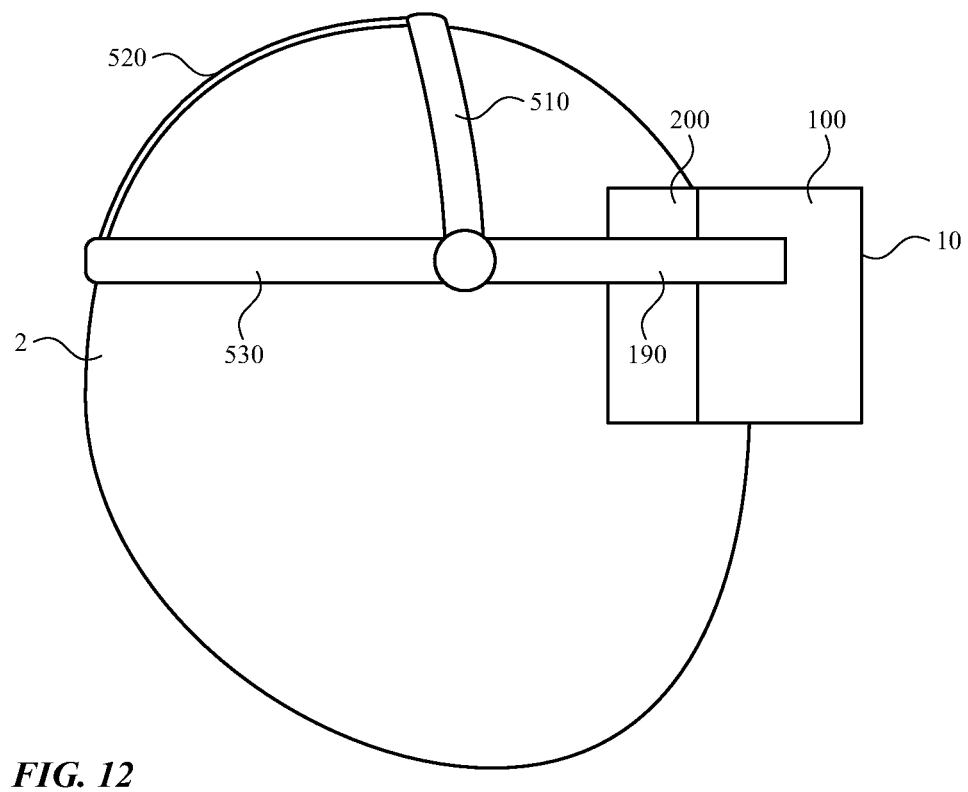
FIG. 12 illustrates a side view of the head-mountable device of FIG. 11, according to some embodiments of the present disclosure.

Referring now to FIGS. 11 and 12, a head securement element of a head-mountable device can be provide robust while distributing weight away from the user's face. While the head-mountable device 10 of FIGS. 11 and 12 is illustrated in a simplified form, it will be understood that components of the head-mountable device 10 of FIG. 1 can be included in the head-mountable device 10 of FIGS. 11 and 12 unless otherwise indicated.

As shown in FIGS. 11 and 12, a head securement element 500 can include multiple bands that extend across the top, sides, and/or rear of a user's head 2. For example, the head securement element 500 can include front bands 510 coupled to opposing sides of the frame 110 of the HMD module 100. The front bands 510 can extend to a top of a user's head 2. The head securement element 500 can further include side bands 530 coupled to the opposing sides of the frame 110 and for extending across sides of the user's head 2 to a rear of the user's head 2. The head securement element 500 can further include a rear band 520 coupling the front bands 510 to the side bands 530 and for extending from the top of the user's head 2 to the rear of the user's head 2.

It will be understood that the front bands 510 and/or the side bands 530 can engage directly or indirectly to the indicated structures. For example, the HMD module 100 can include extensions 190 that extend from and/or are integrally formed with the frame 110. Additionally or alternatively, the front bands 510 can be coupled to the light seal module 200, which is coupled to the HMD module 100.

The various bands can include rigid portions and/or flexible portions to provide support and a comfortable fit on a user. For example, one or more of the front bands 510, the rear band 520, and/or the side bands 530 can include a rigid section that engages the head 2 of the user. In particular, the sides band 530 can include rigid portions that, under tension, apply forces to the sides of the head 2 of the user to bear some weight of the head-mountable device 10.

By further example, one or more of the front bands 510, the rear band 520, and/or the side bands 530 can include a flexible section that accommodates the head 2 of the user. In particular, at least a portion of the front bands 510 and/or the rear band 520 is flexible to conform to the top of the head 2.

The head securement element 500 can further include an adjustment element 550 for adjusting a tightness and/or fit of the head securement element 500. The adjustment element 550 can, for example, be operated to alter a total length of the front bands 510, the rear band 520, and/or the side bands 530. The adjustment element 550 can be operated manually by a user and/or by a controller of the head-mountable device 10 (e.g., in the HMD module 100). Operation of the adjustment element 550 can alter the fit of the head securement element 500 as well as the clamping force of the side bands 530 on sides of the user's head 2.

Accordingly, the head securement element 500 can engage the head 2 without pulling directly on a middle section of the HMD module 100 and/or the light seal module 200. This allows the user to comfortably and freely make facial expressions without the restrictions of excessive tension or forces on the face.

Figure 13:
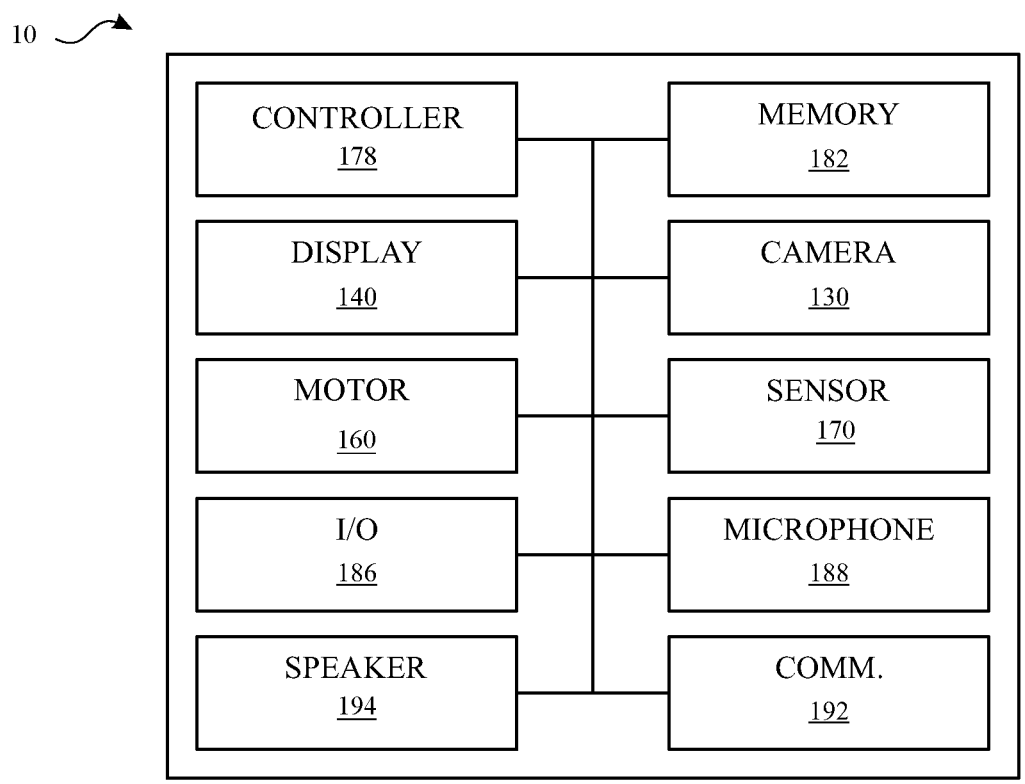
FIG. 13 illustrates a block diagram of a head-mountable device, in accordance with some embodiments of the present disclosure.

Referring now to FIG. 13, components of the head-mountable device can be operably connected to provide the performance described herein. FIG. 13 shows a simplified block diagram of an illustrative head-mountable device 10 in accordance with one embodiment of the invention. It will be appreciated that components described herein can be provided on one, some, or all of an HMD module, a light seal module, a nosepiece, and/or a securement element. It will be understood that additional components, different components, or fewer components than those illustrated may be utilized within the scope of the subject disclosure.

As shown in FIG. 13, the head-mountable device 10 can include a controller 178 (e.g., control circuitry) with one or more processing units that include or are configured to access a memory 182 having instructions stored thereon. The instructions or computer programs may be configured to perform one or more of the operations or functions described with respect to the head-mountable device 10. The controller 178 can be implemented as any electronic device capable of processing, receiving, or transmitting data or instructions. For example, the controller 178 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 10. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 10 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display element 140 for close up viewing. The optical subassembly can include one or more lenses, mirrors, or other optical devices.

The head-mountable device 10 can include adjustment control components described herein, such as a motor 160, an actuator, and the like for moving components to a desired relative position and/or orientation.

The head-mountable device 10 can include one or more sensors 170, as described herein. The head-mountable device 10 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 10 can include an input/output component 186, which can include any suitable component for connecting head-mountable device 10 to other devices. Suitable components can include, for example, audio/video jacks, data connectors, or any additional or alternative input/output components. The input/output component 186 can include buttons, keys, or another feature that can act as a keyboard for operation by the user.

The head-mountable device 10 can include the microphone 188 as described herein. The microphone 188 can be operably connected to the controller 178 for detection of sound levels and communication of detections for further processing, as described further herein.

The head-mountable device 10 can include the speakers 194 as described herein. The speakers 194 can be operably connected to the controller 178 for control of speaker output, including sound levels, as described further herein.

The head-mountable device 10 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 10 can include a battery, which can charge and/or power components of the head-mountable device 10. The battery can also charge and/or power components connected to the head-mountable device 10.

Accordingly, embodiments of the present disclosure provide a head-mountable device that distributes securement forces to sides of the user's head. A head-mountable device can include a head securement element with arms that clamp onto sides of the user's head. Such arms can be pivotably coupled to a frame of the head-mountable device. Where a band is provided, the band can have an adjustable width that tightens onto the sides of the user's head to reduce the load on the front and rear of the user's head. A head-mountable device can also distribute forces (e.g., weight) onto the top of the user's head without restricting facial features of the user (e.g., forehead, eyes, etc.).

Various examples of aspects of the disclosure are described below as clauses for convenience. These are provided as examples, and do not limit the subject technology.

Clause A: a head-mountable device comprising: a frame; a display element supported by the frame; and a head securement element comprising: a pair of arms, each of the arms being rigid and pivotably coupled to the frame; and a band having ends coupled to the frame, the band being flexible and adjustable to adjust a tightness of the band around a head of a user.

Clause B: a head-mountable device comprising: a frame; a display element supported by the frame; and a head securement element comprising: a band extending from sides of the frame; and width adjustment elements each configured to adjust a width of the band in a corresponding region of the band, the width adjustment elements being positioned on opposite sides of the band.

Clause C: a head-mountable device comprising: a frame; a display element supported by the frame; and a head securement element comprising: front bands coupled to opposing sides of the frame and for extending to a top of a user's head; side bands coupled to the opposing sides of the frame and for extending across sides of the user's head to a rear of the user's head; and a rear band coupling the front bands to the side bands and for extending from the top of the user's head to the rear of the user's head.

One or more of the above clauses can include one or more of the features described below. It is noted that any of the following clauses may be combined in any combination with each other, and placed into a respective independent clause, e.g., clause A, B, or C.

Clause 1: the frame and the display element are components of an HMD module, the HMD module further comprising an HMD module attachment element on an inner side of the frame; and the head-mountable device further comprises a light seal module, the light seal module further comprising: a chassis having an outer side and an inner side; a cover extending about the chassis; and a light seal module attachment element on the outer side of the chassis, the light seal module attachment element being configured to engage the HMD module attachment element.

Clause 2: the pair of arms are pivotably coupled to the frame by the light seal module.

Clause 3: the band is coupled directly to the HMD module.

Clause 4: the ends of the band are coupled to the frame by the pair of arms.

Clause 5: the pair of arms are pivotably coupled to the frame by hinges.

Clause 6: the hinges bias the pair of arms toward each other.

Clause 7: the pair of arms comprise user-engagement pads facing each other.

Clause 8: a sensor configured to detect a characteristic of the user.

Clause 9: the band comprises an inner wall and an outer wall; and the width adjustment elements are positioned between the inner wall and the outer wall.

Clause 10: the head securement element further comprises a control thread connected to each of the width adjustment elements, wherein movement of the control thread in a first direction increases the width of the band and movement of the control thread in a second direction decreases the width of the band.

Clause 11: the head securement element further comprises a length adjustment element configured to adjust a length of the band between ends of the band, the ends being coupled to the frame.

Clause 12: width adjustment elements comprise multiple width adjustment elements on each of the opposite sides of the band.

Clause 13: the front bands and the side bands are coupled to the frame by the light seal module.

Clause 14: at least a portion of the side bands are rigid.

Clause 15: at least a portion of the rear band is flexible.

Clause 16: the head securement element further comprises an adjustment element configured to adjust a tightness of the side bands on the sides of the user's head.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a frame;
a display element supported by the frame;
a light seal module having an outer side configured to engage the frame and an inner side configured to engage a face; and
a head securement element comprising:
a pair of arms, each of the arms being rigid and pivotably coupled to the frame by the light seal module;
pads each extending from a side of a corresponding one of the arms, each of the pads having multiple beams extending from the side of the corresponding one of the arms; and
a band having ends directly coupled to the frame, the band being flexible and adjustable to adjust a tightness of the band around a head of a user.

2. The head-mountable device of claim 1, wherein:
the frame and the display element are components of an HMD module, the HMD module further comprising an HMD module attachment element on the inner side of the frame; and
the light seal module further comprises:
a chassis having an outer side and an inner side;
a cover extending about the chassis; and
a light seal module attachment element on the outer side of the chassis, the light seal module attachment element being configured to engage the HMD module attachment element.

3. The head-mountable device of claim 1, wherein the pair of arms are pivotably coupled to the frame by hinges.

4. The head-mountable device of claim 3, wherein the hinges bias the pair of arms toward each other.

5. The head-mountable device of claim 1, wherein the pair of arms comprise user-engagement pads facing each other.

6. The head-mountable device of claim 1, further comprising a sensor configured to detect a characteristic of the user.

7. The head-mountable device of claim 1, wherein the band extends about both of the arms.

8. A head-mountable device comprising:
a frame;
a display element supported by the frame; and
a head securement element comprising:
a band extending from sides of the frame, the band comprising an inner wall and an outer wall; and
width adjustment elements each configured to adjust a width of the band between the inner wall and the outer wall in corresponding regions of the band, the width adjustment elements being positioned on opposite sides of the band, wherein portions of the inner wall that are on the opposite sides of the band face toward each other, and wherein portions of the outer wall that are on the opposite sides of the band face away from each other.

9. The head-mountable device of claim 8, wherein the head securement element further comprises a control thread connected to each of the width adjustment elements, wherein movement of the control thread in a first direction increases the width of the band and movement of the control thread in a second direction decreases the width of the band.

10. The head-mountable device of claim 8, wherein the head securement element further comprises a length adjustment element configured to adjust a length of the band between ends of the band, the ends being coupled to the frame.

11. The head-mountable device of claim 8, wherein width adjustment elements comprise multiple width adjustment elements on each of the opposite sides of the band.

12. A head-mountable device comprising:
a frame;
a display element supported by the frame; and
a head securement element comprising:
a band extending from sides of the frame;
width adjustment elements each configured to adjust a width of the band in a corresponding region of the band, the width adjustment elements being positioned on opposite sides of the band; and
a control thread connected to each of the width adjustment elements, wherein movement of the control thread in a first direction increases the width of the band and movement of the control thread in a second direction decreases the width of the band.

13. The head-mountable device of claim 12, wherein:
the band comprises an inner wall and an outer wall; and
the width adjustment elements are positioned between the inner wall and the outer wall.

14. The head-mountable device of claim 12, wherein the head securement element further comprises a length adjustment element configured to adjust a length of the band between ends of the band, the ends being coupled to the frame.

15. The head-mountable device of claim 12, wherein width adjustment elements comprise multiple width adjustment elements on each of the opposite sides of the band.

* * * * *